E. WHITELEY.

Domestic Boiler.

No. 3,058.

Reissued July 28, 1868.

N. PETERS, Photo-Lithographer, Washington, D. C.

United States Patent Office.

EDWARD WHITELEY, OF BOSTON, MASSACHUSETTS.

*Letters Patent No.* 14,622, *dated April* 8, 1856; *reissue No.* 3,058, *dated July* 23, 1868.

IMPROVEMENT IN CULINARY BOILERS.

The Schedule referred to in these Letters Patent and making part of the same.

TO ALL WHOM IT MAY CONCERN:

Be it known that I, EDWARD WHITELEY, of Boston, Massachusetts, have invented certain new and useful Improvements in Boilers for Steaming Vegetables, and for other purposes, of which the following is a full, clear, and exact description, reference being had to the accompanying drawings, making part of this specification, in which—

Figure 1:
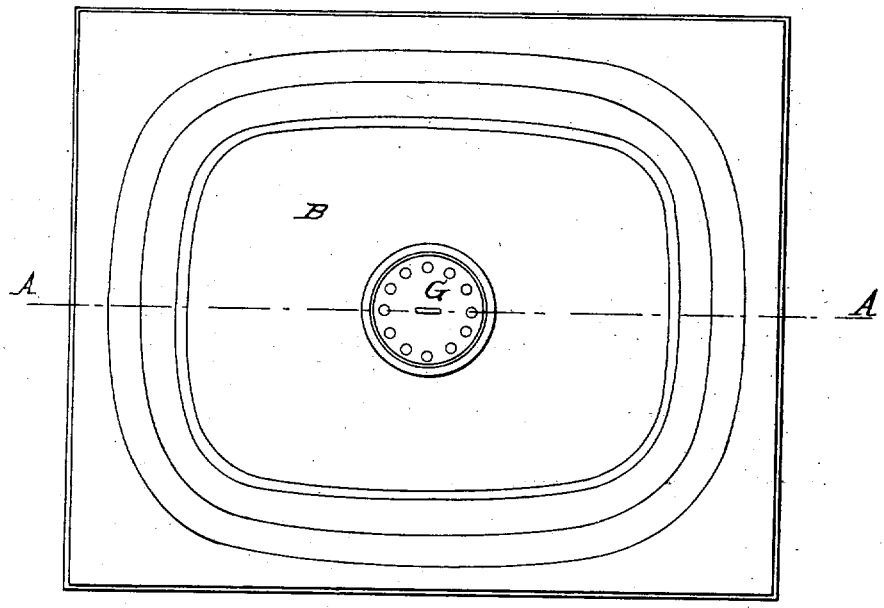

Figure 1 is a plan, with the cover removed.

Figure 2:
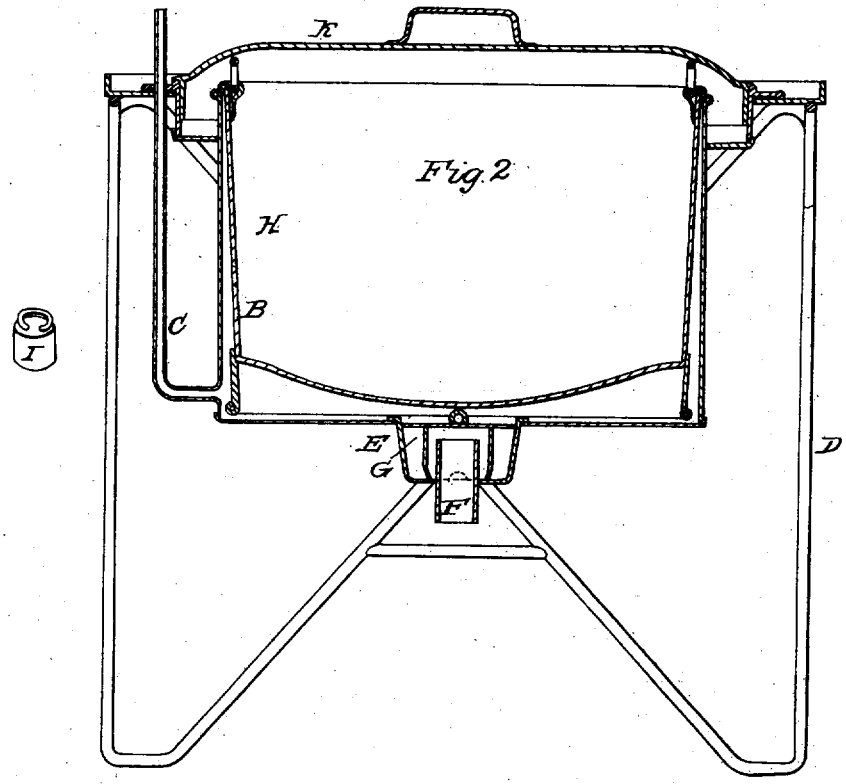

Figure 2, a section upon the line A A of fig. 1, the cover being in place.

The object of my invention is to produce a boiler which may be employed, at will, either as a steamer or a boiler, the cooking, in either case, being effected by means of steam.

In the accompanying drawings, B is the vessel, into which steam is admitted from a suitable boiler, through the pipe C. This vessel is supported permanently upon the stand D, or in any other suitable manner. E is a depression in the bottom of the vessel B, into which rises the tube F, the top of which is surrounded by and covered with the cap, G, thus forming a trap, which permits the water of condensation to pass, but not the steam. Within the vessel B is the interior vessel H, which contains the articles to be cooked. The bottom and sides of this vessel H are perforated, to allow the steam to enter, and circulate freely through the articles to be cooked therein.

These perforations may be dispensed with when the boiler is to be employed in making soups, in which case it operates as a double-jacket kettle, the heat of the steam on the outside of the inner kettle being sufficient to boil the ingredients.

When the boiler is to be used simply for heating water, the interior of the vessel may be removed, and the water heated by the introduction of steam directly thereto. In such case, the trap G is removed, and the pipe F is closed by the cap, I. The steam is prevented from escaping by the cover K, the flange of which sets into a trough surrounding the boiler, which is filled with water.

I am aware perforated kettles have been used, supported by the lid of the outer receptacle, as is the case shown in Webster's Domestic Economy, page 835, figure 684. I therefore do not make a broad claim for perforated kettles, in combination with an outer receptacle for containing steam.

*Claim.*

What I claim as my invention, and desire to secure by Letters Patent, is—

The trap G, and cap, I, or its equivalent, as arranged and applied to the vessel B, whereby the latter may be employed either as a boiler or steamer, as set forth.

I also claim, in combination with the vessel B, the interior vessel H, perforated to admit the steam, when placed within the outer receptacle B, and entirely surrounded or enclosed thereby, substantially as and for the purpose set forth.

E. WHITELEY.

Witnesses:

N. W. STEARNS,

P. E. TESCHEMACHER.